United States Patent
Pfeil et al.

(10) Patent No.: US 6,252,867 B1
(45) Date of Patent: Jun. 26, 2001

(54) METHOD AND APPARATUS FOR DETERMINING REMOTE UNIT LOCATION USING PHASED ARRAY ANTENNA ELEMENTS

(75) Inventors: Jeff L. Pfeil, Bartlett; Alan P. Rottinghaus, Barrington; Stephen W. Henderson, Chicago; Javier J. Tapia, Wheaton, all of IL (US)

(73) Assignee: Motorola, Inc., Scahumburg, IL (US)

( * ) Notice: Subject to any disclaimer, the term of this patent is extended or adjusted under 35 U.S.C. 154(b) by 0 days.

(21) Appl. No.: 09/409,546

(22) Filed: Sep. 30, 1999

(51) Int. Cl.[7] .............................. H04B 17/02; H04B 1/38; H04B 7/216; H04Q 7/20; H04M 1/00
(52) U.S. Cl. ..................... 370/335; 370/328; 455/562; 455/137; 455/456
(58) Field of Search ......................... 370/320, 335, 370/342, 328, 343, 344, 345, 347, 319–321, 326, 478–479, 329; 455/422, 560–562, 132, 137, 140–141, 146–148, 206, 209, 456

(56) References Cited

U.S. PATENT DOCUMENTS

| 5,260,968 | * | 11/1993 | Gardner et al. ...................... 375/200 |
| 5,784,364 | * | 6/1998 | Ahn et al. .............................. 370/335 |
| 5,933,421 | * | 8/1999 | Alamouti et al. ...................... 370/330 |
| 6,128,276 | * | 10/2000 | Agee .................................... 370/208 |

* cited by examiner

Primary Examiner—Huy D. Vu
Assistant Examiner—Kevin C. Harper
(74) Attorney, Agent, or Firm—Kenneth A. Haas (57) ABSTRACT

An apparatus (100) and method dynamically allocates radio frequency receive path resources as required by a programmable location engine (112). The programmable location engine (112) employs cascaded time of arrival and direction of arrival algorithms to determine per remote unit location data. The apparatus (100) employs a phased array antenna (104) and a programmable receiver switching apparatus (108). A plurality of radio frequency receivers (102a–102n) receive a plurality of different carriers, such as CDMA carriers, on each of a different phased array antenna element (106a–106d). An RF switching matrix (126) and mobile location shared resource controller (110) dynamically switch the plurality of radio frequency receivers (102a–102b) to not only receive the different carriers on each of the different phased antenna radio elements to determine time of arrival information, but alternately receive a same carrier signal over all or a portion of the phased array antenna element to determine direction of arrival information.

23 Claims, 8 Drawing Sheets

| PRIORITY | CARRIER | MOBILE ID | SIGNAL TYPE |
|---|---|---|---|
| 1 | 2 | m1234 | 1 |
| 1 | 4 | m1000 | 1 |
| 2 | 1 | m1010 | 1 |
| 2 | 1 | m7777 | 1 |
| 2 | 1 | m2345 | 1 |
| 2 | 2 | m6543 | 1 |
| 2 | 2 | m3453 | 1 |
| 2 | 4 | m4767 | 1 |
| 3 | 1 | m4768 | 1 |
| 3 | 1 | m3465 | 1 |
| 3 | 3 | m2323 | 1 |
| 3 | 5 | m5454 | 1 |
| 3 | 6 | m6565 | 1 |

*FIG. 4*

| CARRIER | EVALUATION PERIODS (DURATION IN TIME LIMITED BY LOCATION ENGINE) | | | | | |
|---|---|---|---|---|---|---|
|  | 1 | 2 | 3 | 4 | 5 | 6 |
| C1 |  |  | C1:m1010, m7777, m2345, m4765, m3465 |  |  |  |
| C2 | C2:m1234, m6543, m3453, m4767 |  |  |  |  |  |
| C3 |  |  |  | C3:m2323 |  |  |
| C4 |  | C4:m1000 |  |  |  |  |
| C5 |  |  |  |  | C5:m5454 |  |
| C6 |  |  |  |  |  | C6:m6565 |
| ... |  |  |  |  |  |  |

TIME → (EVALUATION PERIODS NOT NECESSARY EQUAL IN DURATION... NOT DRAWN TO SCALE AS SHOWN) — 500, 502

*FIG. 5*

LOCATION DETERMINATION (EXAMPLE WITH 4 CARRIERS, 4 RX PATHS)

EVALUATION PERIODS (DURATION IN TIME LIMITED BY LOCATION ENGINE)

| PATH | 1(ALL RX PATHS, TOA) | 2:(C2, DOA) | 3(C4, DOA) | 4(ALL RX PATHS ASSIGNED TO C1, DOA) | 5:(C3, DOA) | 6:(TOA) | 7(C5, DOA) |
|---|---|---|---|---|---|---|---|
| X1 | C1:m1010, m7777, m2345, m4765, m3465 | C2:m1234, m6543, m3453, m4767 | C4:m1000 | C1:m1010, m7777, m2345, m4765, m3465 | C3:m2323 | REPEAT C1 IF REQD | C5:m5454 |
| X2 | C2:m1234, m6543, m3453, m4767 | C2:m1234, m6543, m3453, m4767 | C4:m1000 | C1:m1010, m7777, m2345, m4765, m3465 | C3:m2323 | REPEAT C2 IF REQD | C5:m5454 |
| X3 | C3:m2323 | C2:m1234, m6543, m3453, m4767 | C4:m1000 | C1:m1010, m7777, m2345, m4765, m3465 | C3:m2323 | C5:m5454 | C5:m5454 |
| X4 | C4:m1000 | C2:m1234, m6543, m3453, m4767 | C4:m1000 | C1:m1010, m7777, m2345, m4765, m3465 | C3:m2323 | C6:m6565 | C5:m5454 |
| ... | | | | | | | |

TIME (EVALUATION PERIODS NOT NECESSARY EQUAL ... NOT DRAWN TO SCALE AS SHOWN) →

| RX PATH | RX PATH ALLOCATION TO CARRIER (PER FRAME OR EPOCH) | | | | | | | | | | | | |
|---------|---|---|---|---|---|---|---|---|---|---|---|---|---|
|         | 1 | 2 | 3 | 4 | 5 | 6 | 7 | 8 | 9 | 10 | 11 | 12 | 13 |
| RX4 | c4 | c4 | c4 | c4 | c4 | c4 | c1 | c2 | c3 | c4 | c4 | c4 | c4 |
| RX3 | c3 | c3 | c3 | c3 | c3 | c2 | c1 | c2 | c3 | c4 | c4 | c3 | c3 |
| RX2 | c2 | c2 | c2 | c2 | c1 | c1 | c1 | c2 | c3 | c4 | c3 | c2 | c2 |
| RX1 | c1 | c1 | c1 | c1 | c1 | c1 | c1 | c2 | c3 | c4 | c2 | c1 | c1 |
|     | TOA | TOA | TOA | TOA | TOA | TOA | TOA | TOA | TOA | TOA | TOA | TOA | TOA |

TOA AND DOA CALCULATIONS COMPLETE FOLLOWING PROCESS DELAYS

CONTINUE TOA DATA ACQUISITION ON 4 CARRIERS

810 FOUR RCVRS, ONE PER ANTENNA ALLOCATED TO SINGLE CARRIER FOR DOA DATA ACQUISITION

800 ACCESS PROBES SENSED ON 4 CARRIERS

FIG. 8

METHOD AND APPARATUS FOR DETERMINING REMOTE UNIT LOCATION USING PHASED ARRAY ANTENNA ELEMENTS

CROSS REFERENCE TO RELATED CO-PENDING APPLICATIONS

This application is a related application to a co-pending application entitled "Mobile Unit Location Apparatus and Method for a CDMA Wireless System" having inventors Pfeil et al., filed on even date, owned by instant assignee and hereby incorporated in its entirety by reference.

This application is a related application to a co-pending application entitled "Method and Apparatus for Determining an Angle of Arrival of a Transmitted Signal in a Communication System" having inventors Golovin et al., filed on even date, owned by instant assignee and hereby incorporated in its entirety by reference.

This application is a related application to a co-pending application entitled "Method and Apparatus for Locating a Remote Unit Within a Communication System" having inventors Pfeil et al., filed on even date, owned by instant assignee and hereby incorporated in its entirety by reference.

FIELD OF THE INVENTION

The invention relates generally to methods and apparatus for locating remote units, such as remote units in radio frequency wireless systems, and more particularly to methods and apparatus that utilize a phased array antenna arrangement for determining a location of a remote unit in a wireless communication system.

BACKGROUND OF THE INVENTION

Many wireless communication systems, such as cellular TDMA radiotelephone systems employ some type of mobile unit location apparatus and techniques. Multi-lateration mobile unit location techniques are well known which employ a plurality of base station receivers to triangulate or otherwise determine the location of a mobile unit based on a plurality of different sites.

Other wireless communications systems, such as those employing code division multiple access (CDMA) channelization may use a plurality of CDMA carriers (e.g., codes) over a plurality of different frequencies. A problem can arise with mobile location techniques of CDMA type systems since mobile units typically control their output power as a function of their proximity to a transmitting antenna. For example, as a mobile unit gets closer to a base site antenna, it may lower its output power to allow other mobile units to use the same CDMA carrier. This can provide less interference for other mobile units using the same CDMA carrier. However, as the mobile unit decreases power, the path loss can increase and multi-lateration location can become more difficult since other antennas at other sites may not be able to detect the mobile carrier of the low output power. Accordingly, there is a desire for single site mobile unit location techniques.

Such a single site mobile location system or a multi-site location system may not exist on many cellular base stations. Consequently, the addition of location finding equipment may be required as add-ons to cellular base stations. However, a problem can arise since the addition of single site mobile unit location systems can require additional hardware and/or antennas such as additional CDMA receivers, local oscillators and other front end receiving equipment. This is partly due to the need to provide a mobile unit location apparatus that is compatible with different manufacturers of cellular base stations. However, the duplication of equipment can greatly increase the cost of the overall system.

In addition, for multi-carrier radio telephone systems, such as that defined by IS 95 Proposed EIA/TIA INTERIM STANDARD Wideband Spread Spectrum Digital Cellular System Dual Mode Mobile Station Base Station Compatibility Standard, Apr. 21, 1992 incorporated herein by reference, it is desirable to perform remote unit location determination for many remote units within a single carrier as well cases wherein multiple remote units are assigned to multiple carriers. However, to locate all remote units on traffic channels, duplicate receiver hardware may typically be required to acquire baseband data for multiple carriers. Generally, if wideband receivers are used, such as scan receivers, multiple digital acquisition paths will still be required since remote units to be located may be assigned unique carriers. Thus, locating remote units assigned to unique CDMA carriers requires observation of baseband data within each carrier, which implies the need for digital acquisition paths assigned to each carrier. Further, each of these assigned carriers requires either a wideband multi-carrier receiver, a plurality of multi-carrier receivers, or a plurality of single-carrier receivers.

Moreover, single site location techniques, or multi-site location techniques, may employ time of arrival and direction of arrival algorithms. Yes. It is known in the art to use phased array antennas for determining direction of arrival of incoming signals from remote units. Yes: The use of phased array antennas enables direction of arrival detection by collecting identical copies of the remote unit's transmission at each antenna element. The arrival of these identical copies will have delays at each antenna element that can be evaluated using geometry to determine the angle of arrival. Multipath components of a signal can be descerned up to the design of the phased array and the capabilities of the direction of arrival algorithms.

In addition, access probe signals are also defined in CDMA IS 95C. These access probe signals are typically used by a remote unit to indicate to a base station that the remote unit is available. These access probe signals are typically also generated when a call is sent to begin call set up and use of traffic channels. In the instances where a service, such as an emergency service, wants to know the location of a remote unit as fast as possible, a call may get blocked during channel set up due to congestion or other reasons. This can prevent the location of the remote where only traffic channels are used to determine a remote unit's location. It would therefore be desirable to provide location data for a remote unit prior to traffic channels being used for the communication.

Consequently, a need exists for a remote unit location system and method that can be used in a multicarrier radiotelephone or wireless system while reducing the cost of implementation. It would be desirable if such a system could be used both for single site remote unit location and multi site remote unit location. Such a system and method should also attempt to reduce delays required to obtain location data for selected remote units.

BRIEF DESCRIPTION OF THE DRAWINGS

FIGS. 3.1 and 3.2 are graphic illustrations showing one example of a switch matrix control to provide four channel acquisition, and switch matrix control for providing a same channel acquisition over a phased array antenna, in accordance with one embodiment of the invention.

DETAILED DESCRIPTION OF THE PREFERRED EMBODIMENTS

Briefly, an apparatus and method determines a location of one or more remote units in a wireless communication system by employing a phased array antenna and a programmable receiver switching apparatus. A plurality of radio frequency receivers receive a plurality of different carriers, such as CDMA carriers, on each of a different phased array antenna element. An RF switching matrix and controller dynamically switch the plurality of receivers to not only receive the different carriers on each of the different phased antenna radio elements to determine time of arrival information, but alternately receive a same carrier signal over all or a portion of the phased array antenna element to determine direction of arrival information from received baseband data. The apparatus and method dynamically allocates radio frequency receive path resources as required by a programmable location engine. The programmable location engine employs cascaded time of arrival and direction of arrival algorithms to determine per remote unit location data. For those portions of the location engine that can be performed simultaneously on multiple carriers, receivers are dynamically assigned to unique carriers to facilitate parallel processing. For the portion of the programmable location engine that requires sampling of the entire antenna array, such as for angle of arrival determinations, the receivers are programmed to sample all of the given phased array and antennas elements that are temporarily assigned to a same carrier for data acquisition and subsequent processing.

In one embodiment, a radio frequency switching matrix provides local oscillator frequencies for each of a plurality of RF receivers. A programmable local oscillator outputs the desired local oscillator frequency to the radio frequency switching matrix. A controller controls the radio frequency switching matrix and the programmable local oscillator to dynamically switch the plurality of receivers coupled to each of the phased array antenna elements to a same carrier frequency or each element to a different carrier frequency, depending upon the requirements of the programmable location engine. A plurality of mobile location carrier buffers, such as CDMA carrier buffers, are provided for each carrier so that suitable information received by the receivers can be stored and used for multipass evaluation by the programmable location engine.

In another embodiment, access probe signals are used as the received signals from which location data is determined. The receivers are controlled (i.e., steered to a given carrier via programmable LO) to obtain data for use in determining time of arrival data per remote unit assigned to each of a plurality of carriers, and temporarily controlled to receive the same carrier over the phased array antenna elements for obtaining per remote unit data for angle of arrival calculations. Subsequently, the receivers are reassigned back to different carrier frequencies so that more data can be obtained so time of arrival calculations can continue. The reassigning of receivers back to different carrier frequencies is performed as a function of where remote unit identification data, such as mobile identification (MID), is located within the remote unit access probe signals.

Figure 1:
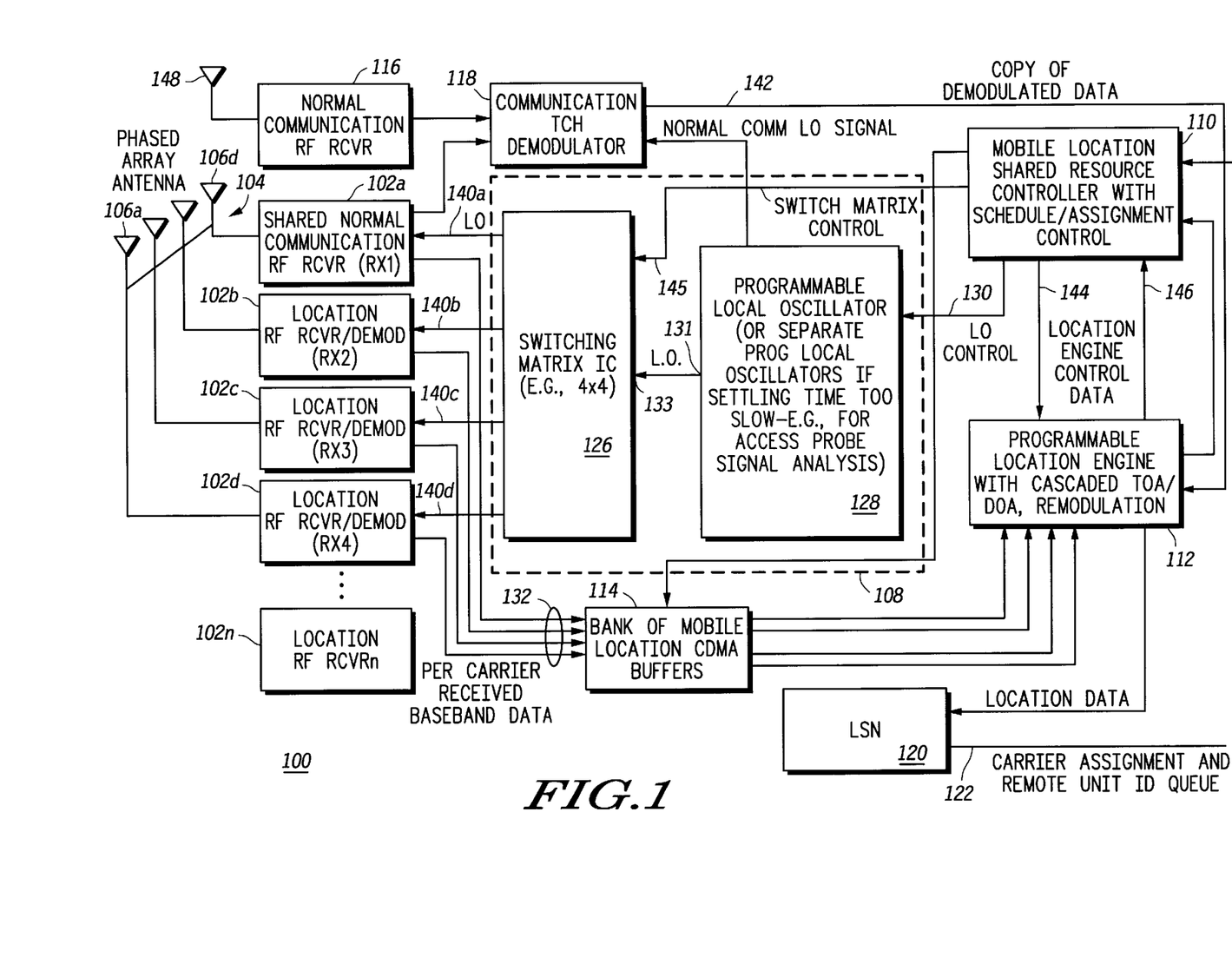
FIG. 1 is a block diagram illustrating one embodiment of an apparatus for determining a location of at least one remote unit in accordance with one embodiment of the invention.

FIG. 1 shows one example of an apparatus 100 having a plurality of radio frequency receivers 102a, 102b, 102c, 102d–102n for determining a location of a remote unit. For purposes of illustration, and not limitation, the disclosed invention will be described with respect to a multicarrier CDMA wireless communication system, such as an IS95/C wireless system. However, it will be recognized that the invention may be employed in any suitable wireless communication system. Also, by way of example, the apparatus 100 will be described with reference to a four carrier multicarrier CDMA wireless system. However, it will be recognized that any suitable number of carriers or type of channelization may be used. The remote unit may be a mobile unit or a stationary unit.

The apparatus 100 also includes a phased array antenna 104 having a plurality of phased array antenna elements 106a–106d, a programmable receiver switching apparatus 108, a mobile location shared resource controller 110, a programmable location engine 112, and a bank of mobile location CDMA buffers 114. For purposes of illustration, the disclosed invention will be discussed as though it is integrated into an existing base station in a radiotelephone system that includes normal communication receiver 116 and normal communication traffic channel demodulators 118, as known in the art. In addition, the apparatus may be employed as part of a BTS, or any other suitable network element within a wireless communication system. As shown here, the apparatus 100 also communicates location data, such as the longitude, latitude, TOA data and/or DOA data a location services node 120. The LSN 120 provides a list of remote units for which location is desired and other information. For example, carrier assignment, remote unit identification and queue information 122 is sent to the mobile location shared resource controller 110. Priority is assigned by the LSN 120 or other network element for each carrier and for each remote unit identified, for example, by a mobile ID. As is well known for CDMA type communication systems, multiple remote units may be using the same carrier and different Walsh codes. Multicarrier CDMA systems employ a plurality of carriers for which each carrier may contain a number, such as 64, remote units wherein each remote unit is assigned one of 64 Walsh codes for a period of time.

The receiver switching apparatus 108 includes a radio frequency switching matrix 126 and a programmable local oscillator 128. The radio frequency switching matrix 126 may be a suitable 4×4 switching matrix integrated circuit, or any suitable switching mechanism. The programmable local oscillator 128 may be a combination of separate programmable local oscillators, each programmable through a local oscillator control signal 130 or bus that provides suitable local oscillator frequency signals 140a–140b at appropriate frequencies for the radio frequency receivers 102a–102d.

The plurality of radio frequency receivers 102a–102n are switched by the switching matrix 126 to receive the selected local oscillator frequency 133 (here four signals) from the programmable local oscillator 128 to control the receivers to receive a plurality of different carriers on each of the different phased array antenna elements 106a–106d in an initial data acquisition period. During this initial data acquisition period, the acquired data is used for determining time of arrival data for a given remote unit. During other data acquisition periods, the plurality of radio frequency receivers 102a–102n, or a suitable subset of the receivers, are controlled to receive a same local oscillator frequency to allow the receivers to receive a same carrier signal for a different period of data acquisition, such as to facilitate angle of arrival location calculations on a per remote unit basis. In this embodiment, the plurality of radio frequency receivers 102a–102n are added receivers to a conventional BTS to facilitate remote unit location. Also as shown, one or more of the radio frequency receivers may be shared with normal communication paths, such as radio frequency receiver 102a to share resources among existing base station receivers to the extent possible. The radio frequency receivers 102a–102d also include suitable CDMA demodulators so that the receivers output despread baseband data 132 for the bank of mobile location CDMA buffers 114. The despread baseband data is used by the programmable location engine to determine location data on a per remote unit basis. The mobile location CDMA buffers 114 and their control is described in more detail in copending application entitled "Mobile Unit Location Apparatus And Method For A CDMA Wireless System", having attorney docket number CE03704R, filed on the same date as instant application by J Pfeil et al., owned by instant assignee and incorporated herein in its entirety.

The mobile location shared resource controller 110 communicates location engine control data 144 to the programmable location engine 112 to indicate to the programmable location engine 112 which location algorithm to use when, such as when to use a time of arrival algorithm versus an angle of arrival (direction of arrival) algorithm. This is based on knowing the current evaluation period, or any other suitable criteria. The mobile location shared resource controller 110 generates a switch matrix control signal 145 to control the switch matrix 126 so that the switch matrix 126 suitably passes the selected local oscillator frequency 133 to the appropriate radio frequency receiver 102a–102n during the evaluation period. The receiver switching apparatus 108 reassigns the plurality of receivers back to different carrier frequencies to obtain additional time of arrival data simultaneously for the plurality of different carriers during the time of arrival acquisition and evaluation periods typically after data for use in direction of arrival has been obtained over multiple phased array antenna elements for a same carrier.

Moreover, the apparatus 100 is preferably, although not necessarily, a single site location remote unit location apparatus such that the phased array antenna 104 is located at a single site with the plurality of RF receivers and other elements of apparatus 100. As such, a single site location apparatus is disclosed that utilizes both time of arrival and direction of arrival determinations. The controller 110 may be a portion of a programmed processing device such as a programmed computer, microprocessor, DSP, state machine, discrete logic or other suitable structure. The programmable location engine 112 may be a software module, hardware configuration or any suitable combination thereof.

Referring to FIGS. 2–6, in operation as shown in block 200, the carrier assignment, remote unit ID and queue information 122 may take the form of a table 400 (FIG. 4) and is evaluated by the mobile location shared resource controller 110. In addition, other operations of the mobile location shared resource controller 110 are also described in the aforementioned co-pending application incorporated herein by reference. As part of the carrier assignment and remote unit ID information table 400, signal type information is also provided to indicate whether the apparatus 100 should be set in a mode to evaluate traffic channels to determine the location of a remote unit, or if the apparatus 100 should be set in a mode to analyze access probe signals to determine the location of a remote unit. Accordingly, the carrier assignment and remote unit ID information table 400 may also include signal type information 402. It will be recognized that this information may be eliminated if, for example, the carrier assignment and remote unit ID information table 400 is coded or sent at a period of time known by the apparatus 100 to be for a given signal type. Accordingly, the mobile location shared resource controller 110 will determine a signal to be analyzed as a traffic channel or an access probe signal or other initial acquisition channel. As shown in block 202, the method includes programming the programmable local oscillator 128 to allow each of the plurality of radio frequency receivers 102a–102n to receive a different carrier on each of different phased array antenna elements 106a–106d based on the assignment information from the carrier assignment remote unit ID information table 400.

The radio frequency switching matrix 126 is coupled to provide local oscillator frequency signals 140a–140d for each of the plurality of RF receivers 102a–102d. The programmable local oscillator 128 uses the programmable oscillator output 131 to output the selected local oscillator frequency 133 as an input for the radio frequency switching matrix 126. The RF switching matrix 126, under control of the programmable local oscillator 128, dynamically switches the plurality of radio frequency receivers 102a–102d, which are coupled to each of the different phase array antenna elements 106a–106d, to different carrier frequencies. This is done during evaluation periods required for time of arrival data acquisition. For direction of arrival data acquisition, the RF switching matrix under control of programmable local oscillator 128, dynamically switches the plurality of radio frequency receivers 102a–102d subsequently to a same carrier signal frequency also for use in determining a location of the remote unit. As noted in the embodiment as shown in FIG. 1, the signals being received are traffic channel signals which are used to determine the location of a remote unit.

Figure 5:
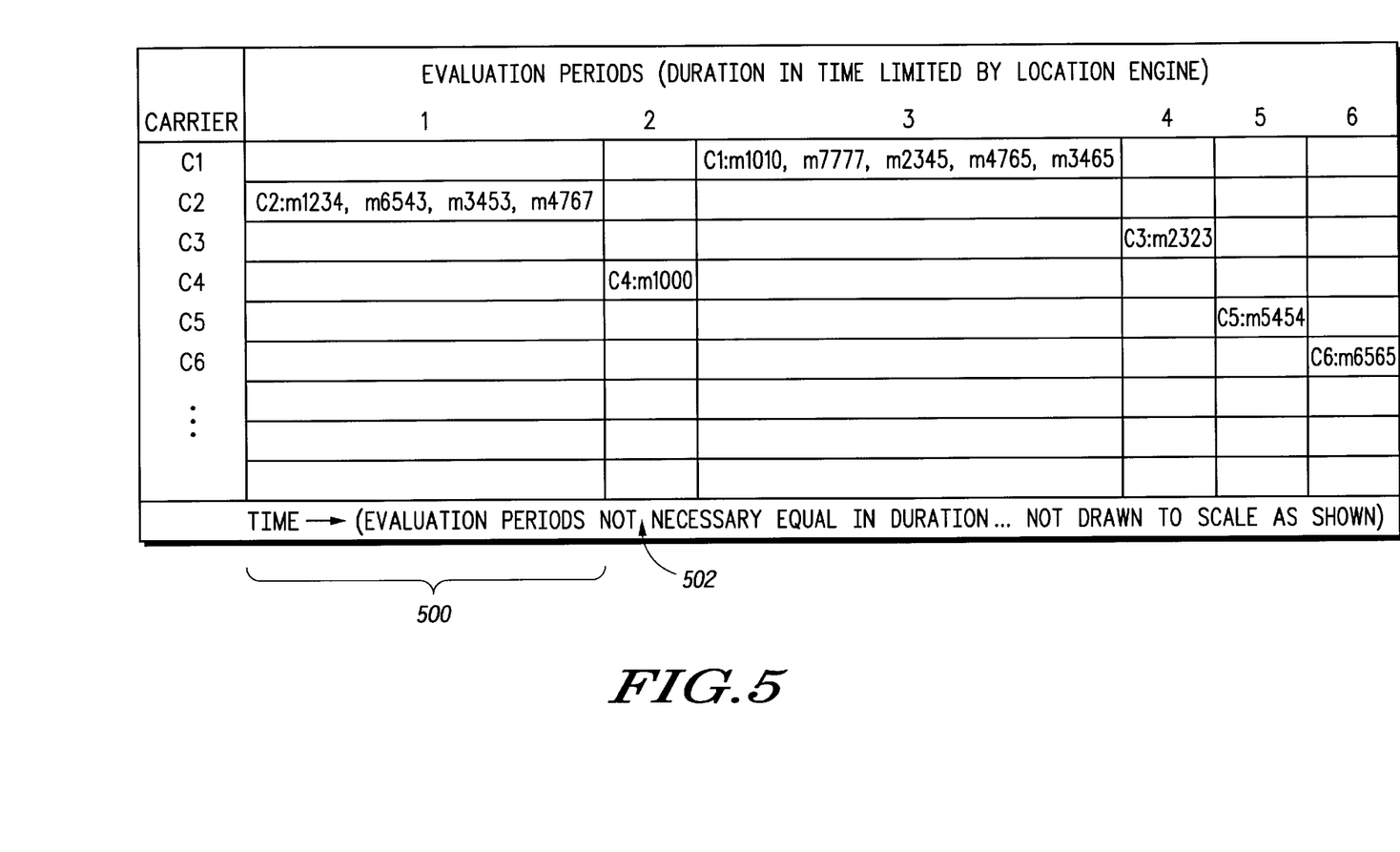
FIG. 5 is a table illustrating one example of location engine evaluation processing in accordance with one embodiment of the invention.
Figure 6:
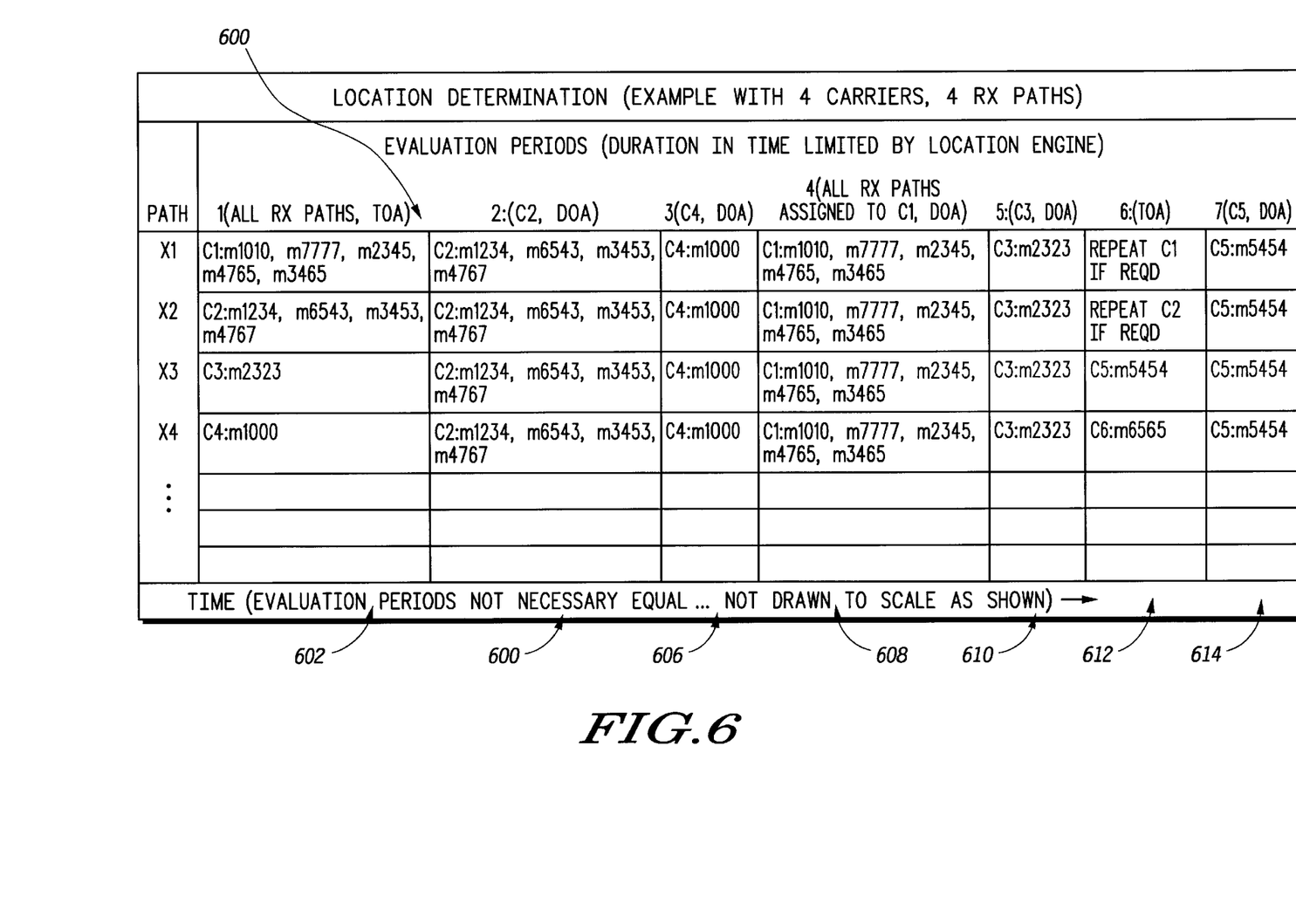
FIG. 6 is an illustration of dynamic receiver assignment in response to the needs of a programmable location engine, in accordance with one embodiment of the invention.

Referring to FIGS. 3, 5 and 6, a mobile location shared resource controller controls the programmable local oscillator 128 to provide selected local oscillator frequencies 132 to the appropriate radio frequency receivers 102a–102d via the switching matrix 126 as shown, for example, by column 600. As shown by way of example, the RF receivers 102a–102d are suitably controlled via local oscillator frequency signals 140a–140d from the switching matrix 126 to each receive a different carrier signal from each of the different phased array antenna elements 106a–106d during a first period to obtain data for use in TOA calculations. For example, receiver 102a is programmed with local oscillator frequency signal 140a to receive a first carrier C1 which contains data for remote units 1010, 7777, 2345, 4768 and 3465. Similarly, RF receiver 102b receives a local oscillator frequency signal 140b to allow the RF receiver 102b to receive a different carrier C2, which contains remote units 1234, 6543, 3453, and so on for other remaining carriers. Hence, these radio frequency receivers receive the plurality of different carriers on each of the different phased array antenna elements for a first period of time 602. The receiver switching apparatus 108, under control of the mobile location shared resource controller 110, dynamically changes the local oscillator frequencies associated with each of the plurality of radio frequency receivers to different frequencies.

Figure 31:
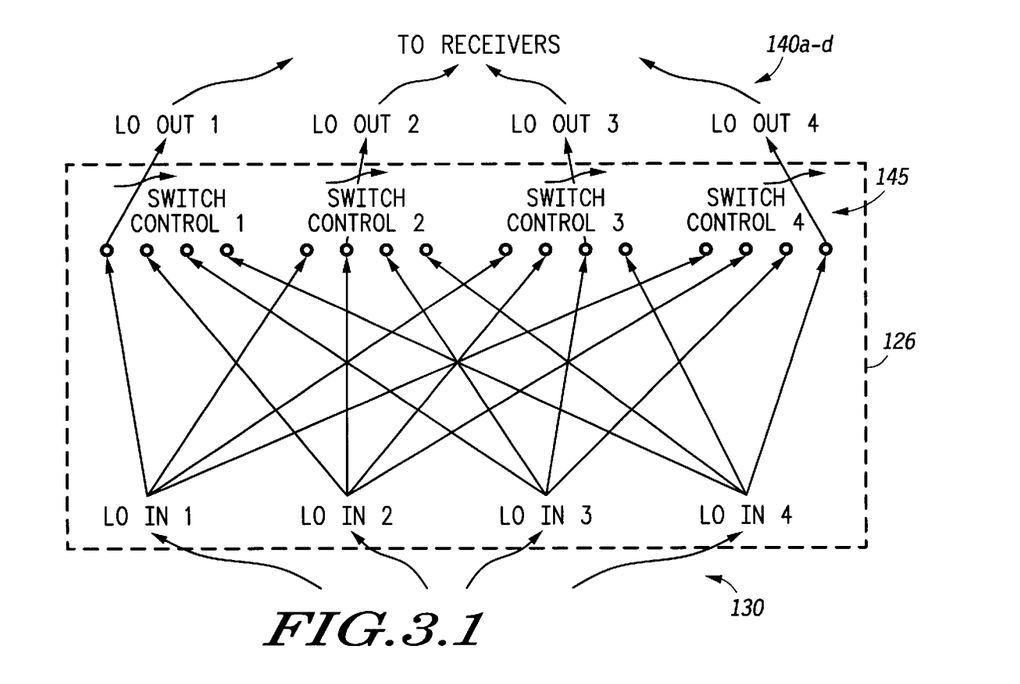
Figure 32:
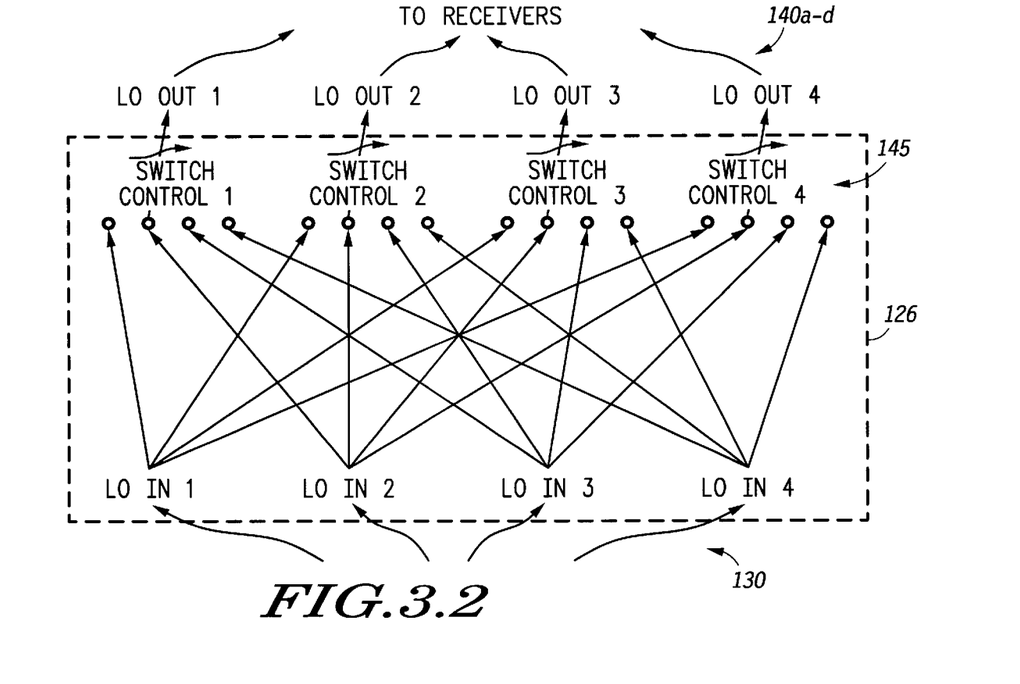

FIGS. 3.1 and 3b illustrate examples of dynamic switching control to provide four channel acquisition and reassignment of receivers to provide data acquisition of a same channel over multiple phased array antenna elements. As shown, where a four by four switching matrix is used, the mobile location shared resource controller 110 sets the RF switching matrix 126 to obtain data from different carriers, each in a different phase array element by control signal 145 controlling the switching matrix 126 to output the appropriate local oscillator frequency signals 140a–140b by selecting appropriate switch control to output the local oscillator frequency 133 to the appropriate radio frequency receiver 102a 102d. The time of arrival data can be obtained by having the radio frequency receivers 102a–102b each receive a different local oscillator frequency selected by the mobile location shared resource controller 110 to provide four carrier acquisition. As shown in FIG. 3.2, the RF switch matrix 126 is controlled to set switches for single or same channel acquisition to obtain data for direction of arrival calculations for remote unit assigned to a selected carrier.

Figure 2:
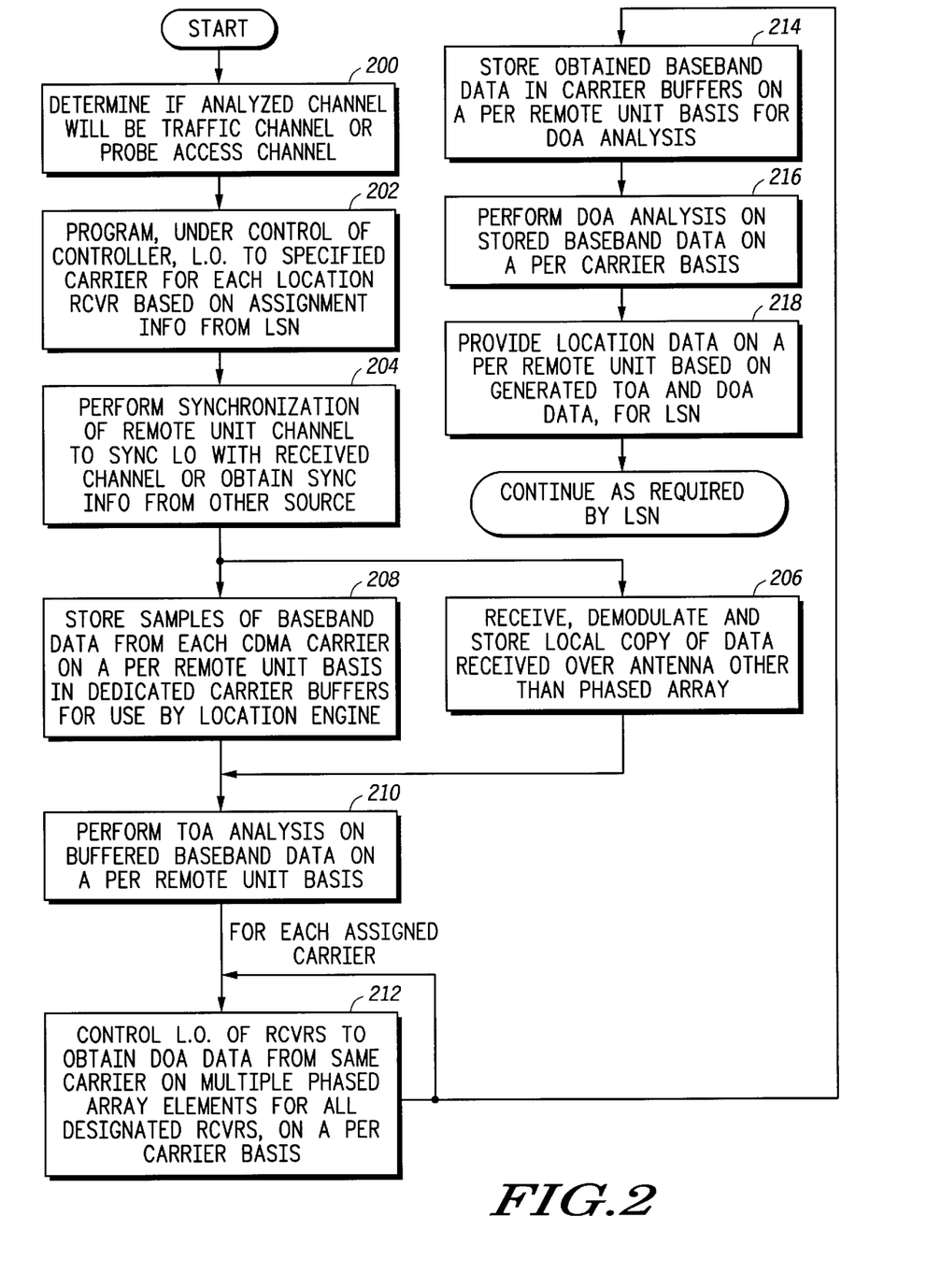
FIG. 2 is a flow chart illustrating one example of the operation of the apparatus shown in FIG. 1.

As shown in block 204, also during this first period of time 602, the RF receivers perform synchronization algorithms which align signal recovery processes to the proper timing offsets, hence allowing signal recovery and location algorithms, as known in the receiver art. Synchronization procedures such as these typically achieve increasing accuracy as remote unit data arrives at the station and coherency is obtained. The synchronization and search process involves determining timing, frequency, and other channel offsets. This is accomplished by comparing a known sequence to the information transmitted by the mobile and received by the remote site. This search achieves coherency as the signal acquisition procedures transition from an uncalibrated state to a synchronized state. In other words, as described in "CDMA Principles of Spread Spectrum Communication" by Andrew J. Viterbi, Addison-Wesley Publishing Company, 1995 ISBN 0-201-63374-4, which is incorporated by reference herein, known sequence re-modulation produces a signal which is then correlated with the remote site received baseband data to produce timing offsets. The known sequence of data is compared to the information received by remote unit within the search window to determine the timing difference relative to the remote unit's internal reference, and subsequently the propagation delay and hence the distance between the mobile and the remote unit. It will be recognized that if the radio frequency receivers 102a–102n are not embedded as part of an existing BTS, for example, it may be necessary to provide channel modem demodulator hardware and/or software to generate suitable synchronization information. The radio frequency receivers are dynamically allocated to provide per remote unit data acquisition from different carriers. In the second data acquisition and evaluation period 602, the radio frequency receivers are assigned to the carriers that have the highest priority assignments.

As shown in block 206, during the evaluation and data acquisition period 602, a local copy of demodulated data 142 is obtained through another antenna system 148 and different receivers and demodulators, to provide a copy of received demodulated data for use in comparison by the programmable location engine 112. Preferably, the demodulated data is obtained through an antenna other than the phased array antenna 106a–106d. The local copy of the demodulated data 142 is provided for all carriers of interest either through different receivers, or if desired, using the location dedicated receivers. Where the radio frequency receivers 102a–102n are used, additional baseband buffers similar to mobile location CDMA buffers 114 would store and provide the copy of demodulated data 142 to the programmable location engine 112. While the local copy of the demodulated data is being obtained, as shown in block 208, the apparatus stores samples of demodulated baseband data from each CDMA carrier in the bank of mobile location CDMA buffers 114 for use by the programmable location engine 112. The demodulated baseband data stored in the bank of mobile location CDMA buffers is baseband data that has been despread, as known in the art.

As shown in block 210, also during the evaluation and data acquisition period 602, the programmable location engine 112 performs time of arrival analysis for each remote unit by obtaining data on a per remote unit basis from the appropriate mobile location CDMA buffer assigned to a remote unit. As such, the programmable location engine 112 determines time of arrival data on a per remote unit basis from each of a plurality of different carriers from each of the different phased array antenna elements. The baseband data 132 is CDMA carrier data, such as despread baseband data, stored on a per carrier basis in the bank of CDMA carrier buffers as described in more detail in co-pending application entitled "Mobile Unit Location Apparatus And Method For A CDMA Wireless System", having attorney docket number CE03704R, previously referenced herein. Where desired, time stamps may also be used and assigned to the received baseband data 132 so that multipass processing may be performed by the programmable location engine for non-real time data, if desired multi-pass processing involves multiple evaluations (either serially or in parallel) to be performed on a common set of acquired baseband sample data.

Once the time of arrival data has been determined by the programmable location engine 112 for all remote units assigned to a given carrier, the programmable location engine sends a signal 146 indicating that it has completed the time of arrival determination on a per remote unit basis, to the mobile location shared resource controller 110.

As shown in block 212, once the time of arrival data has been determined for the designated remote units on the designated carriers, the method includes dynamically switching the plurality of radio frequency receivers that are coupled to each of the different phased array antenna elements, to receive the same carrier signal. This is to provide data for use in a direction of arrival calculation for a remote unit assigned to this carrier. As such, the mobile location CDMA buffers obtain data for use in determining direction of arrival data, and the programmable location engine 112 determines direction of arrival data per remote unit assigned to the same carrier signal in response to the mobile location shared resource controller 110 dynamically switching the receivers to a same carrier signal.

More specifically, the mobile location shared resource controller 110 sends a local oscillator control signal 130 to the programmable local oscillator indicating the local oscillator frequency to be used commonly for all of the desired RF receivers 102a–102n to obtain data for determining direction of arrival data on a per remote unit basis. The switching of the plurality of receivers to receive the same carrier signal via a common local oscillator is shown, for example, during period 604 in FIG. 6. As shown, this period signifies the data acquisition and evaluation period for the direction of arrival calculation. By way of example, during this time period, carrier C2 is received by each of radio frequency receivers 102a–102d at the same time such that the receiver resources are temporarily reassigned to a single carrier, in this case carrier C2 since the highest priority remote unit shown in the list of FIG. 4 was assigned to carrier C2. Given prior synchronization values stored from the first evaluation period 602, the acquisition across the four element based antenna array can be significantly shorter and still provide suitable accuracy. The acquisition and evaluation period 602 is likely to be longer than the acquisition and evaluation period 604, 606 and 608 since these later acquisition periods are used to perform single carrier acquisition and some joint time of arrival and direction of arrival processing by the programmable location engine 112. The TOA process on a per-carrier basis is typically a longer process because of the significant acquisition and processing requirements involved. The DOA algorithms re-use the synchronization determinations made during the TOA determination periods. The evaluation periods 610–614 illustrate the time of arrival and direction of arrival processing performed by the apparatus 100 for remote units assigned to carriers five and six (C5 and C6). The dynamic receiver assignment allows for fewer lengthy time synchronization acquisition and processing periods since it takes less time to take acquisition snapshots across the phased array antenna for the direction of arrival processing periods since synchronization information is obtained in previous time periods during the time of arrival data acquisition periods.

Referring back to FIG. 2, as shown in block 214, the method includes storing the perceived baseband data for use in determining direction of arrival data by the programmable location engine 112. As shown in block 216, the method includes performing the direction of arrival analysis by the programmable location engine 112 and again sending a completion signal 146 to the mobile location shared resource controller 110 when the direction of arrival data, determined on a per remote unit basis, is complete. As shown in block 212, the apparatus is controlled to obtain the data from the same carrier signal for use in a direction of arrival determination for each desired carrier. Accordingly, the process may be repeated for additional carriers. For example, an additional step of obtaining or determining direction of arrival data for other remaining carriers of the plurality of different carriers is accomplished by dynamically switching the receivers to commonly receive each of the remaining carriers in a sequential manner. This is shown for example, in periods 606, 608 and 610 of FIG. 6.

Figure 4:
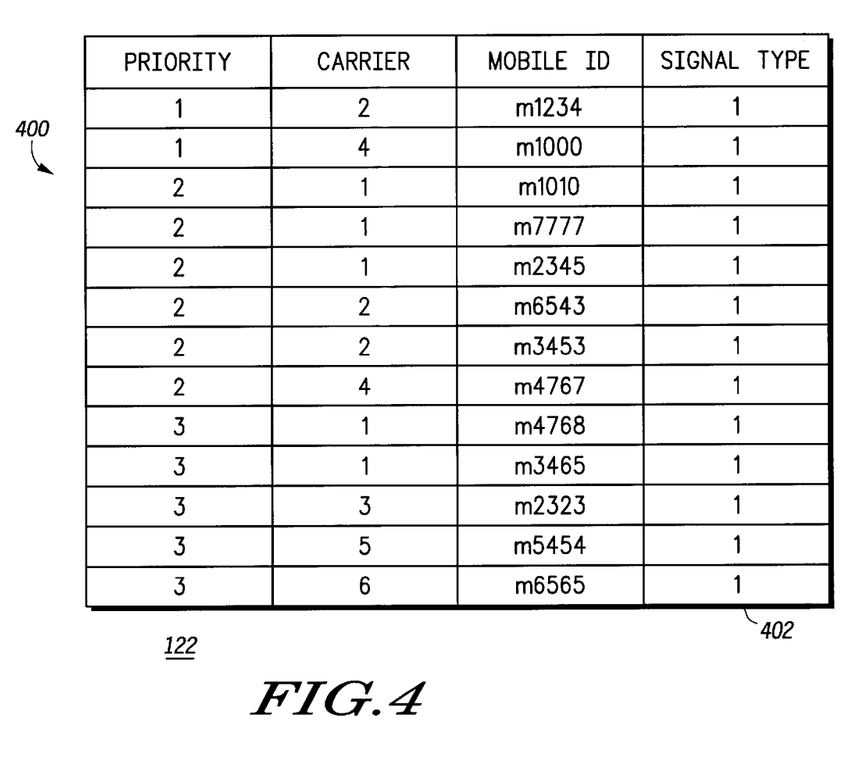
FIG. 4 is a chart illustrating an example of priority information and carrier assignment for a plurality of remote units identified by mobile identification data in accordance with one embodiment of the invention.

Referring to FIG. 5, the evaluation periods used by the programmable location engine 112 may be controlled by the assigned priority level of a given carrier. For example, as shown in evaluation period 500, carrier C2 is first carrier detected since carrier C2 has the highest priority as shown in the queue information table 400 (FIG. 4). These evaluations may be, for example, the time of arrival evaluations. As shown in evaluation period 502, the programmable location engine may next evaluate the carrier C4, since this carrier has a second level priority and fewer remote units to analyze. Depending upon the system, it is likely that evaluation periods may require six sets of frames and duration, one set of frames per carrier with the number of frames required in a set for evaluation processing predominated by the time required for synchronization. Multiple location determinations for a selected remote unit can be performed over the same set of acquired channel data.

Figure 7:
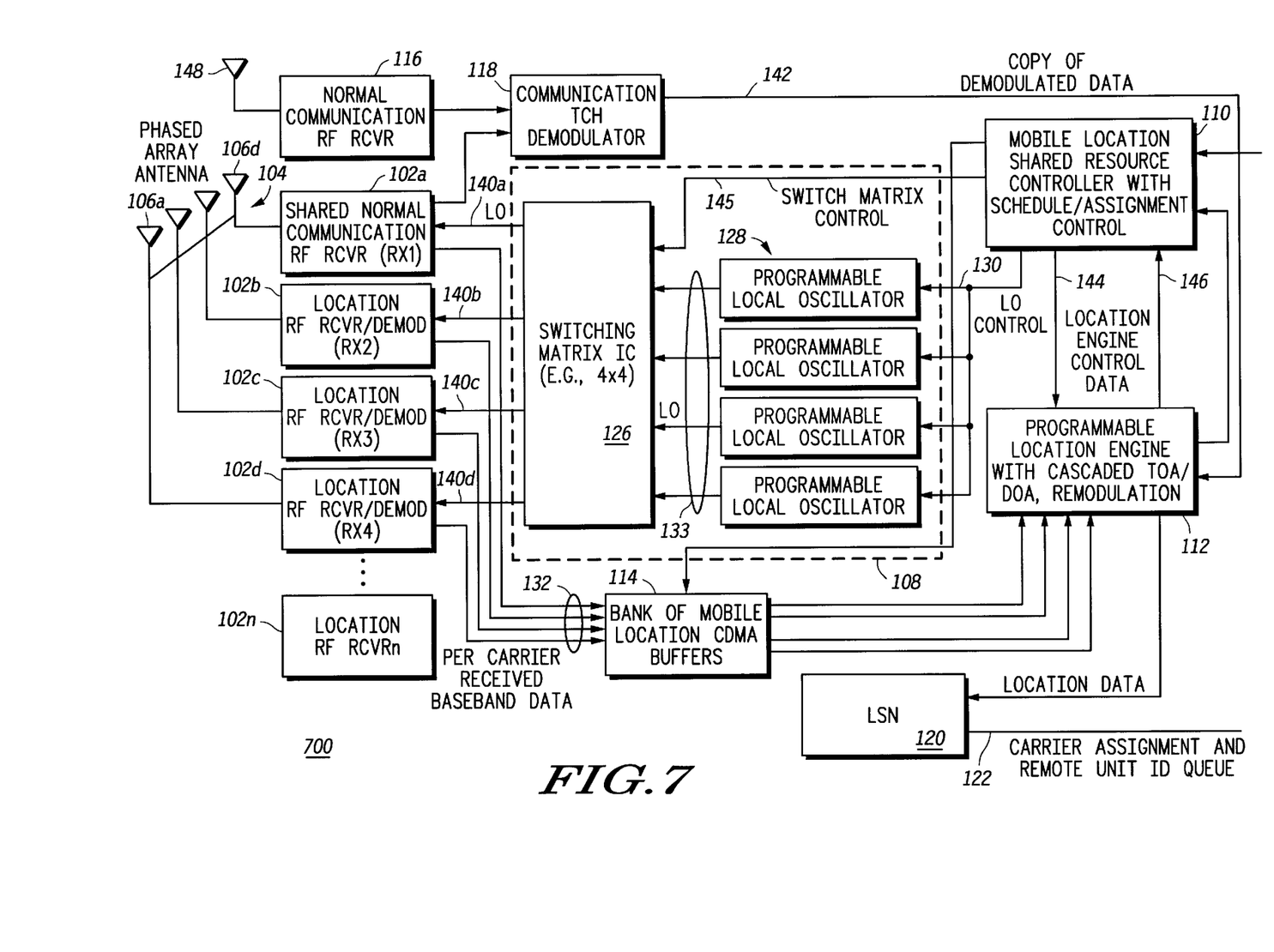
FIG. 7 is a block diagram illustrating one example of an apparatus for determining a location of at least one remote unit based on access probe signals in accordance with one embodiment of the invention.

FIG. 7 illustrates an alternative embodiment where the apparatus 700 evaluates access probe signals instead of, or in addition to, traffic channel signals. The apparatus 700 is substantially the same as the apparatus 100 shown in FIG. 1, except that the mobile location shared resource controller 110 sends location engine control data 144, local oscillator control signal 130, and switch matrix control data 145 to the requisite elements as a function of where remote unit identification data, such as mobile ID data, is located within the remote unit access probe signals. As such, the initial assigning of receivers to obtain the time of arrival data and the reassigning of the receivers to receive a same (common) carrier for DOA data and the reassigning of receivers back to receive different carrier frequencies is performed as a function of where the remote unit identification data is located within the remote access probe signals. For example, where access probe signals including mobile ID data located after a preamble, such as the access probe signals described, for example, in IS95/C, the mobile location shared resource controller 110 switches the radio frequency receivers 102a–102d from the time arrival acquisition period to a direction of arrival acquisition period and back to a time of arrival acquisition period, before mobile ID data is received after the preamble, so that the apparatus 700 can acquire the mobile ID data. Accordingly, a location of the remote unit may be performed in an efficient manner prior to set up being complete. This may provide useful location information in emergency situations where a call cannot be completed due to various reasons, and may also find advantages in other situations.

Moreover, the access probe signals are typically shorter in duration than communications over traffic channels. Accordingly, the programmable location engine 112 utilizes a time of arrival algorithm primarily during the access probe duration. A time of arrival determination is performed on the same or slightly less than the full access probe. The direction of arrival calculation can be performed using a smaller sample set, namely a shorter duration.

It will be recognized by those of ordinary skill in the art that the programmable local oscillator and the local oscillators of the receivers have sufficient retune specifications to not interfere with direction of arrival acquisition. Coherent sampling of each of the antenna elements is completed during a snapshot sufficient to perform array analysis. Calibration of the phased array antenna is updated as necessary to compensate for any phase imbalance between the phased array antenna element receive paths. This calibration is typically performed via an injected signal at the array, but may also be performed via other external stimulus such as a reference remote unit.

Figure 8:
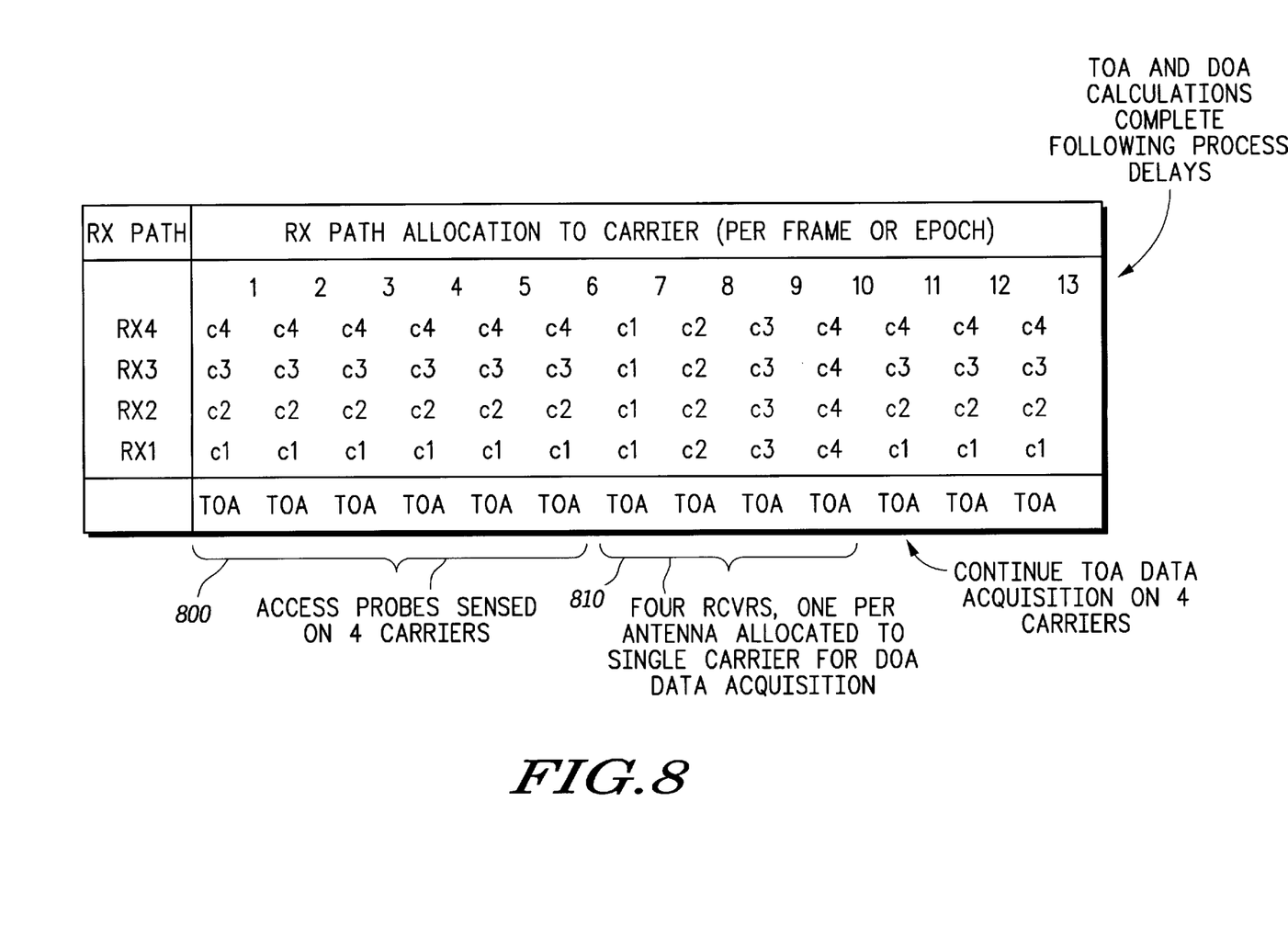
FIG. 8 is a chart illustrating one example of receiver control and data acquisition sequencing of the apparatus shown in FIG. 7.

FIG. 8 illustrates a table showing the dynamic allocation of receiver assignment for an access probe signal. As shown, time of arrival data is acquired and analyzed during periods 800 and 810. As shown by acquisition periods 800, the mobile location shared resource controller 110 controls the receiver switching apparatus 108 to detect the access probes for four carriers to obtain baseband data for time of arrival calculations. The time of arrival (TOA) of an access probe's prompt ray is determined by the programmable location engine 112 in a conventional manner as known in the art. Preferably a time of arrival algorithm that may also be used may be found in co-pending application entitled "Method and Apparatus for Determining an Angle of Arrival of a Transmitted Signal in a Communication System" having inventors Golovin et al., attorney docket number CE08217R, filed on even date, owned by instant assignee and hereby incorporated in its entirety by reference. After the receivers are coupled to receive a plurality of different carriers on each of the different phased array antenna elements 106a–106d for the access probe signal, the mobile location shared resource controller 110 controls the receiver switching apparatus 108 to control the plurality of RF receivers 102a–102n to receive a same carrier during the time period 810 for access probe signals to obtain baseband data for direction of arrival calculations by the programmable location engine 112. The TOA algorithm is cascaded with a DOA algorithm by using the timing reference of the access probe's prompt ray provides an index into the stored baseband data used for the direction of arrival calculations. Any suitable phased array direction of arrival algorithm, as known in the art may be used. Subsequently, the mobile location shared resource controller 110 reassigns the RF receivers 102a–102n to continue time of arrival data acquisition for four carriers prior to the detection of the mobile identification data embedded in the access probe signal.

The programmable location engine, is programmable since the controller may control which algorithm may be used to switch time. For example, a time of arrival algorithm is used to evaluate baseband data stored in the location CDMA buffers. The controller may then program the programmable location engine to then later perform direction of arrival calculations on baseband data stored when the phased array antenna elements are programmed through receipt of the same carrier signal over the plurality of different phased array antenna elements. One example of suitable cascaded time of arrival and direction of arrival algorithms may operate as follows. For a given set of remote units on a given set of carriers, the channel parameters (timing offsets, energy measurements, frequency offsets) are determined and stored for each remote unit. The channel parameter determination can be accomplished through a variety of means, such as storing communication modem parameters, detecting the correlation peak of the highest energy arriving ray, detecting the correlation peak of the earliest arriving ray, etc. Once the receivers have been steered to a common carrier via a common LO reference, the DOA processing can begin. Immediately following a settling time for the receivers (typically the propagation time of the signal through the filter response), the acquisition of common carrier phased array baseband data can begin. Using the channel parameters discovered during the TOA algorithm processing, DOA algorithms a performed on the phased array data. This typically involves a dot-product operation yielding complex-valued results for each antenna element. These can then be evaluated for an angle of arrival determination. A common technique involves the zero-padding of the array 'signature' (i.e., the dot product results). The zero-padded vector is then passed through a spectral analysis (typically an fast Fourier transform), the peak spectral energy proportional to the angle of arrival.

It will also be recognized, for example, that the controller need not be a shared resource controller but may be a stand alone processing device with any other suitable component. In addition, it will be recognized that the functionality described herein may be performed by other elements of the apparatus 100 as desired. In addition any number of suitable phased array antenna elements, either in a linear array, non-linear array or suitable combination thereof may be used. Moreover, it should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What Is claimed Is:

1. A method for locating a remote unit comprising the steps of:
    (a) receiving a plurality of different carriers on each of a different phased array antenna element;
    (b) dynamically switching a plurality of receivers coupled to each of the different phased array antenna elements to receive a same carrier signal, from the plurality of different carriers, over a plurality of the different phased array antenna elements; and
    (c) reassigning the plurality of receivers back to different carrier frequencies to obtain additional time of arrival data for the remote unit, wherein the plurality of different carriers include remote unit access probe signals and wherein the step of reassigning the plurality of receivers back to different carrier frequencies, is performed as a function of where remote unit identification data is located within the remote unit access probe signals.

2. The method of claim 1 including the step of controlling a local oscillator frequency for each of the plurality of receivers to different frequencies and subsequently to a same carrier signal frequency for use in determining a location of the remote unit.

3. The method of claim 2 wherein the plurality of different carriers are CDMA multi-carriers containing CDMA carrier data.

4. The method of claim 3 including selectively controlling a plurality of mobile location CDMA carrier buffers wherein each of the plurality of mobile location CDMA carrier buffers is controlled to receive CDMA carrier data on a per carrier basis.

5. The method of claim 4 including the step of evaluating CDMA carrier data stored in the plurality of mobile location CDMA carrier buffers multiple times to generate time of arrival data for a selected remote unit.

6. The method of claim 1 wherein the step of dynamically switching the plurality of receivers coupled to each of the different phased array antenna elements to receive the same carrier includes dynamically changing local oscillator frequencies associated with each of the plurality of receivers to a same frequency during remote unit access probe signals to determine a location of the remote unit.

7. The method of claim 1 wherein the step of dynamically switching the plurality of receivers coupled to each of the different phased array antenna elements to receive the same carrier includes dynamically changing local oscillator frequencies associated with each of the plurality of receivers to a same frequency during traffic channel signals to determine a location of the remote unit.

8. The method of claim 1 including the steps of:
    determining time of arrival (TOA) data, on a per remote unit basis, for remote units assigned to each of the plurality of different carriers on each of the different phased array antenna elements;
    determining direction of arrival (DOA) data, on a per remote unit basis, in response to dynamically switching the plurality of receivers coupled to each of the different phased array antenna elements to receive a same carrier signal; and
    determining direction of arrival (DOA) data, on a per remote unit basis, for remote units assigned to at least a subset of remaining carriers of the plurality of different carriers by dynamically switching the plurality of receivers coupled to each of the different phased array antenna elements to commonly receive each of the subset of remaining carriers.

9. The method of claim 1 including the step of (c) reassigning the plurality of receivers back to different carrier frequencies to obtain additional time of arrival data for the remote unit.

10. A method for locating a remote unit comprising the steps of:
   (a) receiving a plurality of different CDMA carriers on each of a different phased array antenna element located at a single site to determine time of arrival data on a per remote unit basis;
   (b) dynamically switching a plurality of receivers coupled to each of the different phased array antenna elements at the single site, to receive a same CDMA carrier signal, from the plurality of different CDMA carriers, over a plurality of the different phased array antenna elements to determine direction of arrival data on a per remote unit basis; and
   (c) reassigning the plurality of receivers back to different CDMA carrier frequencies to determine additional time of arrival data for remote units assigned to the plurality of different CDMA carriers, wherein the plurality of different CDMA carriers include remote unit access probe signals and wherein the step of reassigning the plurality of receivers back to different carrier frequencies, is performed as a function of where remote unit identification data is located within the remote unit access probe signals.

11. The method of claim 10 including the step of controlling a local oscillator frequency for each of the plurality of receivers to different frequencies and subsequently to a same CDMA carrier signal frequency for use in determining a location of a remote unit.

12. The method of claim 10 wherein the step of dynamically switching the plurality receivers coupled to each of the different phased array antenna elements to receive the same CDMA carrier signal includes dynamically changing local oscillator frequencies associated with each of the plurality of receivers to a same frequency during remote unit access probe signals to determine a location of the remote unit.

13. The method of claim 10 wherein the step of dynamically switching the plurality of receivers coupled to each of the different phased array antenna elements to receive the same carrier signal includes dynamically changing local oscillator frequencies associated with each of the plurality of receivers to a same frequency during traffic channel signals to determine a location of the remote unit.

14. The method of claim 10 including the steps of:
   determining time of arrival (TOA) data, on a per remote unit basis, for remote units assigned to each of the plurality of different CDMA carriers on each of the different phased array antenna elements;
   determining direction of arrival (DOA) data, on a per remote unit basis, for remote units assigned to the same CDMA carrier signal in response to dynamically switching the plurality of receivers coupled to each of the different phased array antenna elements to receive the same CDMA carrier signal; and
   determining direction of arrival (DOA) data, on a per remote unit basis, for remote units assigned to a subset of remaining carriers from the plurality of the different CDMA carriers by dynamically switching the plurality of receivers coupled to each of the different phased array antenna elements to commonly receive each of the subset of remaining CDMA carriers.

15. The method of claim 14 including selectively controlling a plurality of mobile location CDMA carrier buffers wherein each of the plurality of mobile location CDMA carrier buffers is controlled to receive CDMA carrier data on a per carrier basis.

16. The method of claim 15 including the step of evaluating CDMA carrier data stored in the plurality of mobile location CDMA carrier buffers multiple times to generate time of arrival data for a selected remote unit.

17. An apparatus for determining a location of at least one remote unit comprising:
   a plurality of radio frequency (RF) receivers, operatively coupled to a phased array antenna, that receives a plurality of different carriers on each of different phased array antenna elements for a first period of time;
   a receiver switching apparatus, operatively coupled to the plurality of RF receivers, wherein the receiver switching apparatus reassigns the plurality of receivers back to different carrier frequencies to obtain additional time of arrival data from the plurality of different carriers, wherein the plurality of different carriers include remote unit access probe signals and wherein the reassigning of the receivers back to different carrier frequencies is performed as a function of where remote unit identification data is located within the remote unit access probe signals; and has
   a controller, operatively coupled to the plurality of RF receivers and to the receiver switching apparatus, having control signals to control the receiver switching apparatus to control the plurality of RF receivers to receive a same carrier signal for a second period of time, from the plurality of different carriers, over a plurality of different phased array antenna elements.

18. The apparatus of claim 17 wherein the receiver switching apparatus includes:
   a radio frequency (RF) switching matrix operatively coupled to provide a local oscillator frequency for each of the plurality of RF receivers; and
   a programmable local oscillator, operatively coupled to the controller, having a local oscillator output operatively coupled to an input of the frequency switching matrix,
   wherein the RF switching matrix, under control of the programmable local oscillator, dynamically switches the plurality of receivers coupled to each of the different phased array antenna elements to different carrier frequencies and subsequently to a same carrier signal frequency for use in determining a location of the remote unit.

19. The apparatus of claim 17 wherein the receiver switching apparatus dynamically changes local oscillator frequencies associated with each of the plurality of receivers to a same frequency to detect remote unit access probe signals to determine a location of the remote unit.

20. The apparatus of claim 17 wherein the receiver switching apparatus dynamically changes local oscillator frequencies associated with each of the plurality of receivers to a same frequency to detect traffic channel signals to determine a location of the remote unit.

21. The apparatus of claim 17 including a programmable location engine, operatively coupled to the controller, that determines time of arrival (TOA) data on a per remote unit basis, for remote units assigned to each of the plurality of different carriers received from each of the different phased array antenna elements; that determines direction of arrival (DOA) data, on a per remote unit basis, for remote units assigned to the same carrier signal, in response to dynamic switching of the plurality of receivers coupled to each of the different phased array antenna elements, to receive the same carrier signal; and that determines direction of arrival (DOA) data, on a per remote unit basis, for remote units assigned to a subset of remaining carriers of the plurality of different carriers in response to dynamic switching of the plurality of receivers coupled to each of the different phased array antenna elements to commonly receive each of the subsets of remaining carriers.

22. The apparatus of claim 21 wherein the plurality of different carriers are CDMA multi-carriers containing CDMA carrier data and further including a plurality of mobile location CDMA carrier buffers wherein each of the plurality of mobile location CDMA carrier buffers is controlled to receive CDMA carrier data on a per carrier basis.

23. The apparatus of claim 22 wherein the programmable location engine evaluates CDMA carrier data stored in the plurality of mobile location CDMA carrier buffers multiple times to generate time of arrival data for a selected remote unit.

* * * * *